US008446453B2

(12) United States Patent
Tian et al.

(10) Patent No.: US 8,446,453 B2
(45) Date of Patent: May 21, 2013

(54) EFFICIENT AND ON DEMAND CONVERGENCE OF AUDIO AND NON-AUDIO PORTIONS OF A COMMUNICATION SESSION FOR PHONES

(75) Inventors: Yongjian Tian, Sunnyvale, CA (US); Zheng Yuan, San Jose, CA (US); Tejas Bhandarkar, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 719 days.

(21) Appl. No.: 12/683,021

(22) Filed: Jan. 6, 2010

(65) Prior Publication Data
US 2011/0164107 A1 Jul. 7, 2011

(51) Int. Cl.
*H04N 7/14* (2006.01)
*H04M 3/42* (2006.01)

(52) U.S. Cl.
USPC .................. 348/14.08; 348/14.01; 348/14.02; 348/14.09; 370/522; 379/90.01; 379/93.08; 379/142.04; 455/404.1; 455/414.2; 455/456.1; 455/462; 455/552.1

(58) Field of Classification Search
USPC ...... 348/14.08, 14.01, 14.02, 14.09; 370/522; 379/90.01, 93.08, 93.09, 93.17, 142.04; 455/404.1, 412.2, 414.2, 456.1, 462, 552.1, 455/550.1; 709/224; 725/116
See application file for complete search history.

(56) References Cited

U.S. PATENT DOCUMENTS

| 5,297,146 | A | * | 3/1994 | Ogawa ........................... 370/522 |
| 6,856,682 | B1 | | 2/2005 | Ham |
| 6,876,734 | B1 | | 4/2005 | Summers et al. |
| 6,922,568 | B1 | * | 7/2005 | Nakamura ..................... 455/462 |
| 7,133,510 | B1 | | 11/2006 | Freeman et al. |
| 7,239,338 | B2 | * | 7/2007 | Krisbergh et al. ......... 348/14.01 |
| 7,305,069 | B1 | | 12/2007 | Day |
| 7,340,046 | B2 | | 3/2008 | McClung et al. |
| 7,379,087 | B2 | * | 5/2008 | Yamatari et al. ........... 348/14.09 |

(Continued)

FOREIGN PATENT DOCUMENTS

| EP | 1 921 855 | 5/2008 |
| WO | WO 03/056859 | 7/2003 |

OTHER PUBLICATIONS

Apple, Inc., Apple Push Notification Service Programming Guide, Internet Citation: http://markmail.org/download.xqy?id=hsk5hjvtkrixm23c&number=1 printed Jan. 2011, 38 pages.

(Continued)

*Primary Examiner* — Gerald Gauthier

(57) ABSTRACT

In one embodiment, source data for a communication session may be split into an audio portion for transmission on a phone channel and a non-audio portion for transmission on a data channel. A server and a phone may accordingly establish an audio portion of a communication session on the phone channel. In response to a trigger, the server may provide a push notification on the data channel to the phone, where the push notification is associated with an application executing on the phone that is configured to participate in the non-audio portion of the communication session on the data channel with the server. Upon obtaining the push notification on the data channel during the audio portion on the phone channel, the application may correspondingly activate on the phone to participate in the non-audio portion of the communication session during the phone's participation in the audio portion (e.g., merging the portions).

20 Claims, 7 Drawing Sheets

U.S. PATENT DOCUMENTS

| | | | |
|---|---|---|---|
| 7,412,598 | B1 | 8/2008 | Gleichauf |
| 7,555,536 | B2 | 6/2009 | Dodrill et al. |
| 7,571,317 | B1 | 8/2009 | Vilhuber |
| 7,616,944 | B2 * | 11/2009 | Gustavsson et al. ........ 455/412.2 |
| 7,664,525 | B2 * | 2/2010 | Matsumoto ................ 455/552.1 |
| 7,853,245 | B2 * | 12/2010 | Yach et al. ................. 455/414.2 |
| 8,031,844 | B1 * | 10/2011 | Ho et al. .................... 379/90.01 |
| 8,169,462 | B2 * | 5/2012 | Ryu ........................... 348/14.02 |
| 8,223,185 | B2 * | 7/2012 | Gratton et al. ............. 348/14.01 |
| 8,265,247 | B2 * | 9/2012 | Baccay ................... 379/142.04 |
| 8,325,213 | B2 * | 12/2012 | Lamb et al. ................ 348/14.01 |
| 8,336,076 | B2 * | 12/2012 | Oh et al. ....................... 725/116 |
| 2005/0208962 | A1 * | 9/2005 | Kim ........................... 455/550.1 |
| 2007/0223444 | A1 | 9/2007 | Foo et al. |
| 2008/0037446 | A1 | 2/2008 | Zhou et al. |
| 2008/0253545 | A1 | 10/2008 | Gleichauf |
| 2008/0311879 | A1 * | 12/2008 | Martin et al. .............. 455/404.1 |
| 2008/0318592 | A1 * | 12/2008 | Mandalia .................... 455/456.1 |
| 2010/0208030 | A1 * | 8/2010 | Kim et al. .................. 348/14.02 |
| 2010/0215161 | A1 * | 8/2010 | Baccay ................... 379/142.04 |
| 2011/0161487 | A1 * | 6/2011 | O'Sullivan et al. ........... 709/224 |
| 2011/0164107 | A1 * | 7/2011 | Tian et al. .................. 348/14.08 |
| 2011/0164735 | A1 * | 7/2011 | Yuan et al. ................. 379/93.08 |

OTHER PUBLICATIONS

Cisco Systems, Inc., Cisco WebEx Meeting Center for iPhone Data Sheet, Internet Citation: http://static.webex.com/apple/Cisco_WebEx_iphone.pdf, Jan. 2009, 2 pages.

Ensor, J.R., et al., Control Issues in Multimedia Conferencing, Communications for Distributed Applications and Systems Proceedings of the Conference on Communications Software, TRICOMM, NY, New York, IEEE, Apr. 1991, 11 pages.

IBM, System for Multicall Session Management, IP.Com Journal, IP.Com Inc., West Henrietta, NY, Jun. 2, 2006, 6 pages.

Liu, Feng, et al., An Approach of Integrating SIP in Converged Multimodal/Multimedia Communication Services, Computer Communications and Networks, Proceedings of the $12^{th}$ International Conference, IEEE, Piscataway, NJ, Oct. 2003, 6 pages.

Rothenbucher, Anita, PCT Notification of Transmittal of the International Search Report and the Written Opinion of the International Searching Authority, or the Declaration, International Application No. PCT/US2010/003268, International Filing Date: Dec. 30, 2010, European Patent Office, Rijswijk, Netherlands, Document Date: Feb. 24, 2011, 14 pages.

* cited by examiner

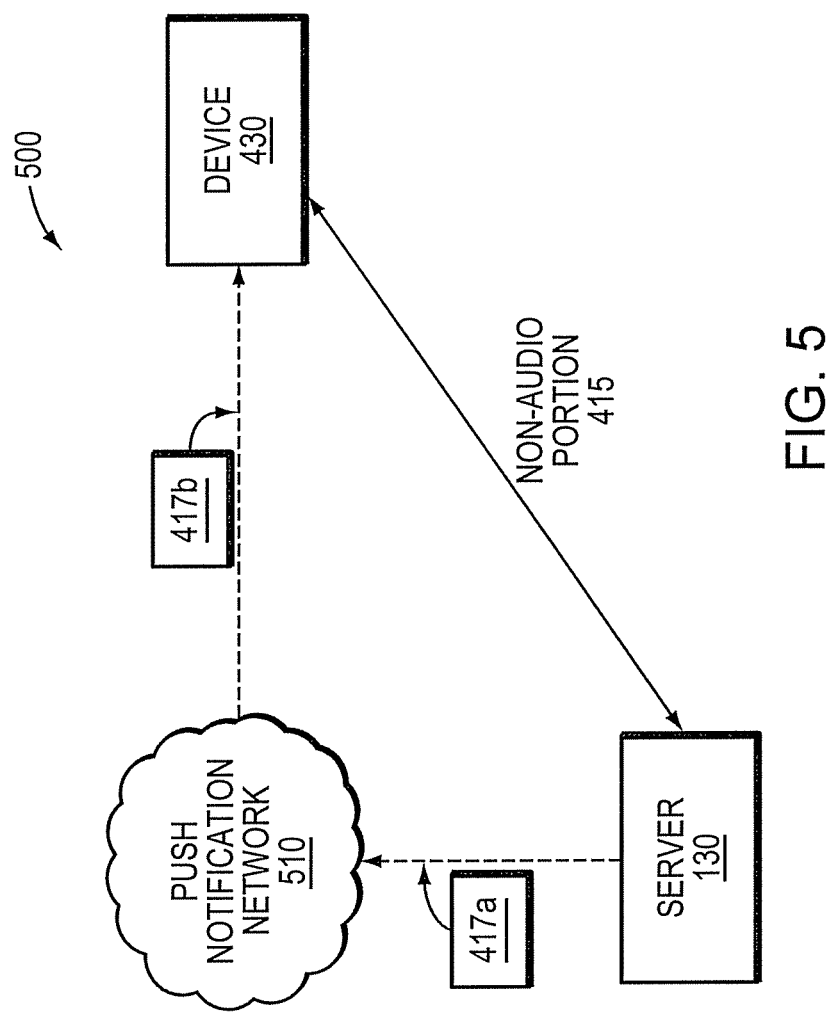

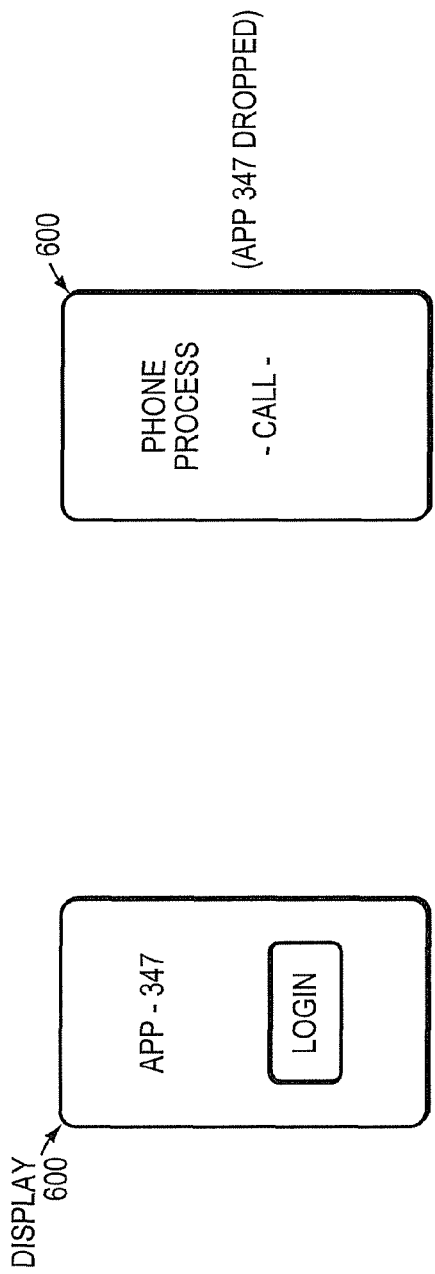
FIG. 6A
FIG. 6B
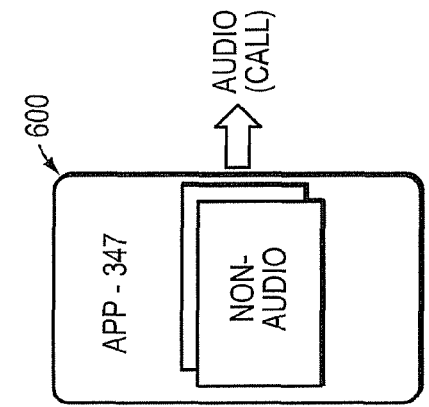
FIG. 6C
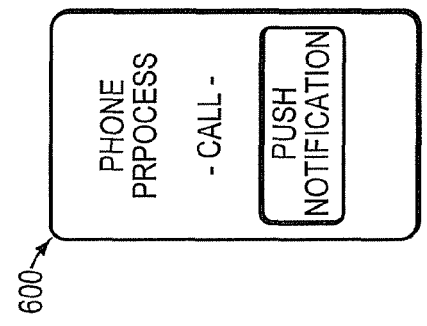
FIG. 6D

EFFICIENT AND ON DEMAND CONVERGENCE OF AUDIO AND NON-AUDIO PORTIONS OF A COMMUNICATION SESSION FOR PHONES

CROSS REFERENCE TO RELATED APPLICATION

The present application is related to commonly owned, copending U.S. patent application Ser. No. 12/683,079, which is entitled EFFICIENT TRANSMISSION OF AUDIO AND NON-AUDIO PORTIONS OF A COMMUNICATION SESSION FOR PHONES, filed by Yuan et al. on even date herewith.

TECHNICAL FIELD

The present disclosure relates generally to communications sessions transmitted over networks, and, more particularly, to the communication of audio and non-audio material with phones.

BACKGROUND

Audio, video, and data streams may be transmitted through a computer network between a variety of devices. For instance, Voice over IP (VoIP), video over IP, images, text, etc., may all be forms of information travelling through the network between computers and phones (e.g., mobile phones and/or smartphones). Often, certain types of communication, such as online meetings, video, etc., have both an audio component and a "non-audio" component (e.g., video, data, etc.). Transmission of the audio and non-audio components for computers interconnected to the Internet may receive both components over a data (e.g. IP) network. Phones, however, generally have a different set of capabilities than online computers, such as limited data bandwidth and/or reduced processing ability.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 5 illustrates an example push notification network;

FIGS. 6A-6D illustrate example phone displays; and

DESCRIPTION OF EXAMPLE EMBODIMENTS

Overview

According to one or more embodiments of the disclosure, a server and a phone may establish an audio portion of a communication session on a phone channel. In response to a certain trigger, the server may provide a push notification on a separate data channel to the phone, where the push notification is associated with an application executing on the phone that is configured to participate in a non-audio portion of the communication session on the data channel with the server. Upon obtaining the push notification on the data channel during the audio portion on the phone channel, the application may correspondingly activate to participate in the non-audio portion of the communication session during the phone's participation in the audio portion.

Description

Figure 1:
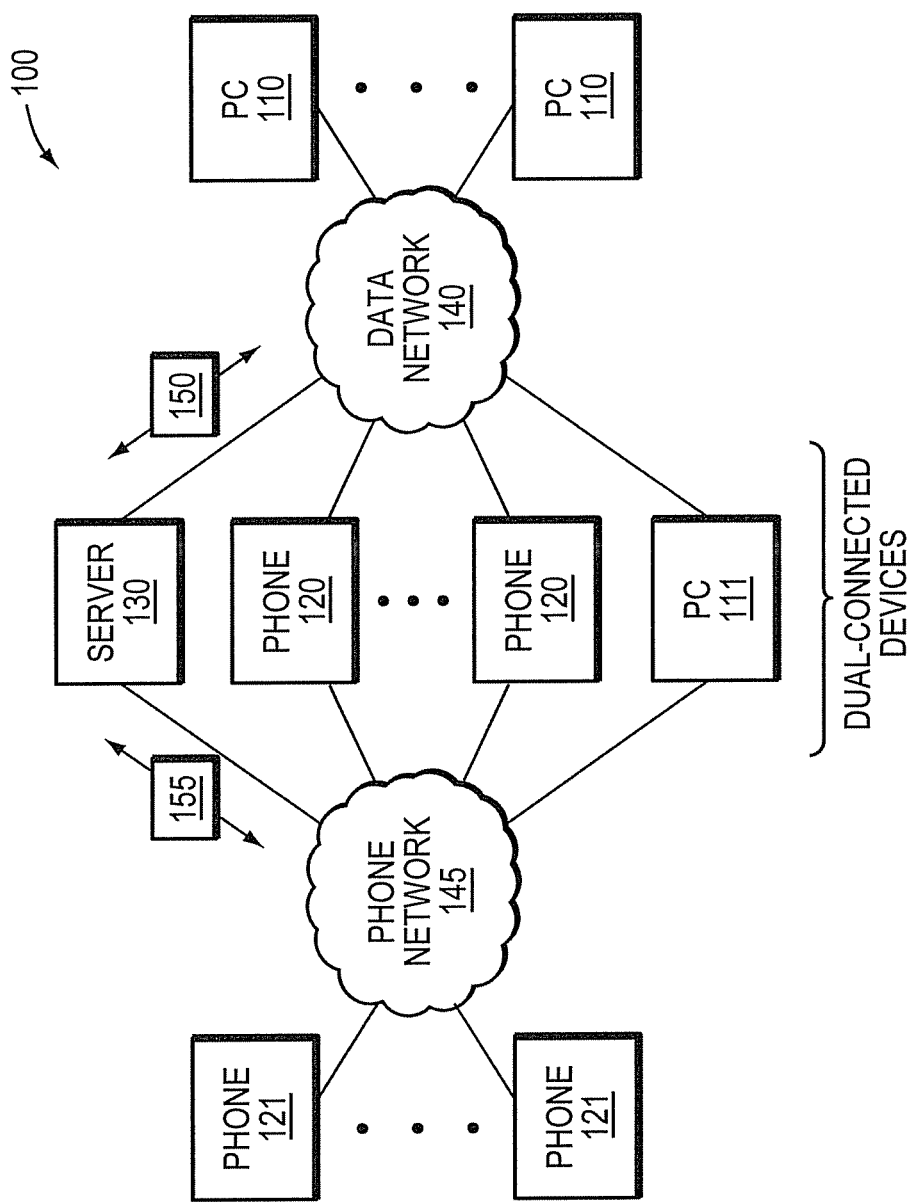
FIG. 1 illustrates an example phone network and data network.

FIG. 1 is a schematic block diagram of an example computer network 100 illustratively comprising nodes/devices, such as one or more participant/client devices, e.g., computers (personal computers or "PCs") 110/111 and phones 120/121 interconnected to an illustrative server 130 by links/networks as shown and as described further herein. For instance, participant devices may be interconnected with the server on a data network 140, such as the internet (e.g., IP network), and/or a phone network 145, such as a phone provider's land-based or mobile/cellular network. Illustratively, PCs 110 are interconnected with the server 130 only on the data network 140, while PC 111 is shown having dual-connectivity with the data network and phone network 145. Further, phones 120 are shown having dual-connectivity, while phone 121 is shown having only phone network connectivity. Data packets 150 may travel on the data network, while phone traffic 155 (e.g., audio signals) may travel on the phone network, such as according to various protocols. Those skilled in the art will understand that any number of nodes, devices, links, etc. may be used in the computer network, and that the view shown herein is for simplicity.

In this environment, a number of participants may interact in one or more communication sessions. Such a setting can be used for a meeting, training or education, support, or any other event that may require a number of participants to communicate, interact, collaborate, or otherwise participate, such as web conferences, online meetings, phone calls, video calls, etc. As used herein, a "session" describes a generally lasting communication between one or more participant devices through the server 130. Those skilled in the art will understand that the session may be implemented/established using protocols and services provided by various layers (e.g., application, session, and/or transport layers) of a network protocol stack according to the well-known OSI model.

In particular, each participant device may comprise an electronic device with capability for visual and/or auditory presentation. Thus, a participant device can be, for example, a desktop personal computer (PC), a laptop computer, a workstation, a personal digital assistant (PDA), a wireless telephone (e.g., cellular, mobile, etc.), a smart phone, an Internet television, and the like. Each participant device supports communication by a respective participant, in the form of suitable input device (e.g., keyboard, mouse, stylus, keypad, etc.) and output device (e.g., monitor, display, speech, voice, or other device supporting the presentation of audible/visual information). Each participant device may be interconnected with a suitable communications network such as, for example, the data network 140 and/or the phone network 145, as described herein. In one embodiment, each participant device may operate under the control of a suitable operating system to run software applications which may be installed, received, or downloaded. At least some of these software applications may support specific functions, such as, for example, functions related to the communication sessions.

The communication sessions, e.g., between the various participants, may be supported by a server 130. The server 130 may be a computer system that is connected to networks 140/145, and which may comprise and appear as one or more server computers thereon. Also, the server 130 may store information (e.g., content) which can be provided to the participant devices, such that the server is a source of the communication session (e.g., audio, video, presentations, etc.).

The data network 140 may comprise or be supported by one or more suitable communication networks to deliver content to the interconnected devices. The Internet is an example data network that interconnects computer clients and servers located throughout the world and exchanges information according to Transmission Control Protocol/Internet Protocol (TCP/IP), Internetwork Packet eXchange/Sequence Packet eXchange (IPX/SPX), AppleTalk, or other suitable protocol. Other proprietary data networks may also be used, such as broadband access, cellular data networks, satellite data networks, and any other suitable transmission network designed to carry data.

Phone network 145 may be an analog, digital, or IP-based network that is designed and implemented by phone service providers to carry audio streams between audio devices, such as land-line phones and mobile phones. A cellular telephone network is one example phone network 145, as is a satellite telephone network or the conventional land-line based public switched telephone network ("PSTN," aka the "plain old telephone system" or "POTS").

Those skilled in the art will appreciate that data can be transmitted on phone networks, and that phone calls may be carried on a data network, but for the purpose of discussion herein, a "phone network 145" carries audio/phone calls on a phone channel, while a "data network 140" carries non-audio data on a separate data channel. That is, both the phone channel and data channel may, in certain situations, use the same underlying physical technology, such as the same IP network for portions of the transmission, but phone/audio sessions and data/non-audio sessions may be carried in different streams across the networks, and may be treated differently along the way.

Figure 2:
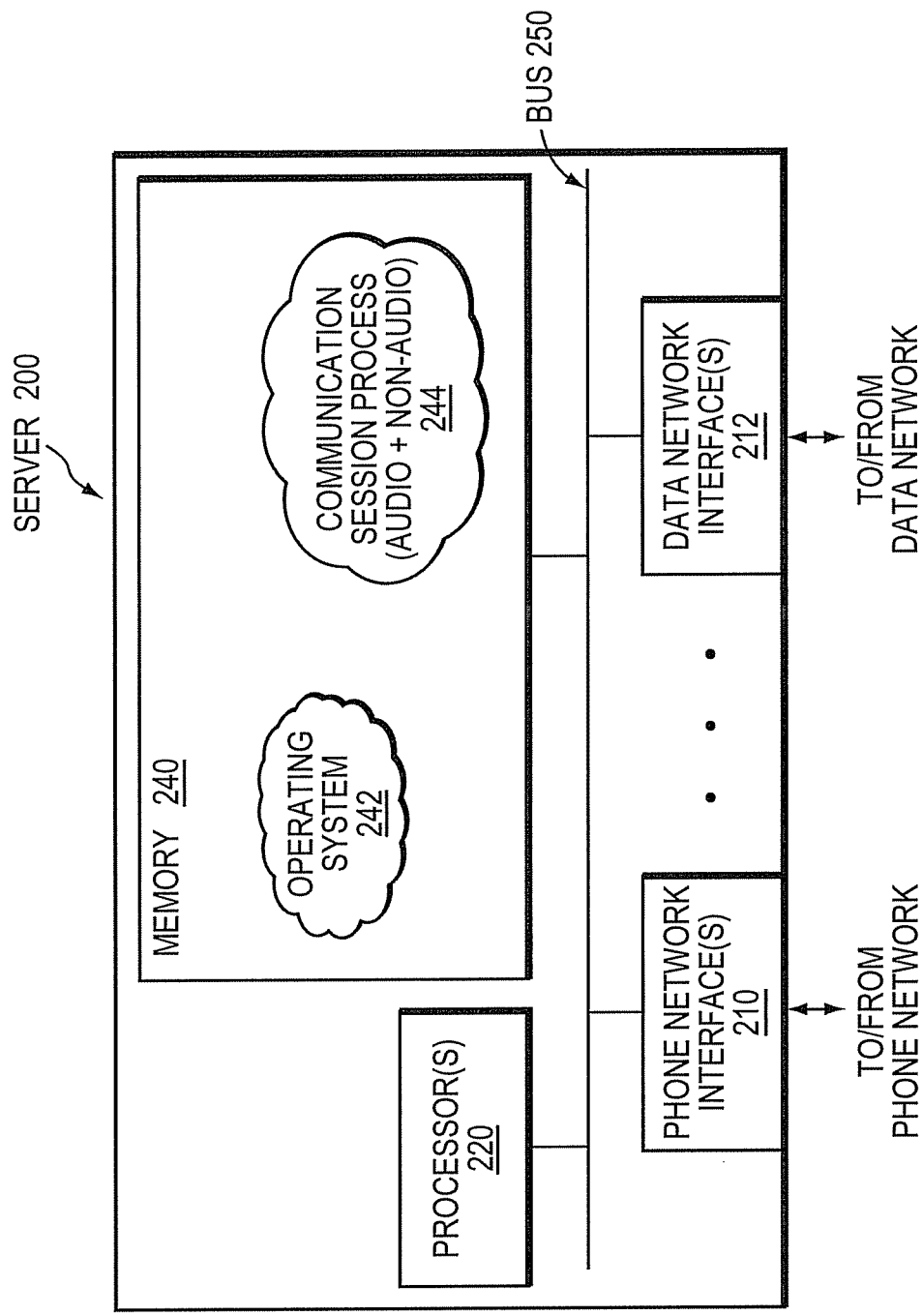
FIG. 2 illustrates an example server.

FIG. 2 illustrates a schematic block diagram of an example server 200 (130) that may be used with one or more embodiments described herein, e.g., for communication sessions. Illustratively, server 200 may be implemented or incorporated in any suitable computing device operating under the control of any suitable operating system. In particular, the device 200 comprises one or more phone network interfaces 210 and one or more data network interfaces 212, at least one processor 220, and at least one memory 240 interconnected by a system bus 250.

Note that while the illustrative embodiment described shows a single server, a collection of servers (e.g., localized and/or distributed) may also operate to perform the functions described herein. For example, "server 200" (or "130") may comprise a separate server for communication on each of the types of networks (e.g., a web server and a telephony server), for each type of action (e.g., splitting streams, sending/requesting push notifications as described herein, etc.), and so on, where the servers communicate with each other to produce the end result (i.e., in this instance, the communication session operating as described herein). Thus, "server 200" may comprise, either as a single server or as a collection of servers, one or more memories, one or more processors, one or more network interfaces (e.g., adapted to communicate traffic for a communication session), etc., as may be appreciated by those skilled in the art.

The network interfaces 210/212 contain the mechanical, electrical, and signaling circuitry for communicating data over physical/wireless links coupled to the networks 145/140. The network interface(s) may be configured to transmit and/or receive data using a variety of different communication protocols suitable for the corresponding network.

The memory 240 comprises a plurality of storage locations that are addressable by the processor 220 and the network interfaces 210/212 for storing software programs associated with the embodiments described herein. The processor 220 may comprise necessary elements or logic adapted to execute the software programs and manipulate the data structures. An operating system 242, portions of which are typically resident in memory 240 and executed by the processor, functionally organizes the device by, inter alia, invoking operations in support of software processes and/or services executing on the server. In particular, these software processes and/or services may illustratively comprise a communication session process 244, which may contain computer executable instructions executed by the processor 220 to generally perform functions to manage or control various processes or aspects during the course of a communication session as described herein. It will be apparent to those skilled in the art that other types of processors and memory, including various computer-readable media, may be used to store and execute program instructions pertaining to the techniques described herein.

In addition, according to one or more embodiments described herein, a communication session, such as an online collaborative computing session, a video call, etc., may comprise one or more "sub-sessions," such as a different sub-session for various components or features of the session itself. For instance, these sub-sessions may comprise, e.g., voice, data, desktop sharing, document sharing (portable document), video, chat, file transfer, remote access, etc. Communication between participants may thus be achieved with one or more of the above sub-sessions enabled. For example, if a chat sub-session is enabled then an attendee can send a chat message to one or more other attendees while with desktop sharing sub-session enabled the presenter can share his/her desktop with all attendees, etc. These sub-sessions are specific to the type of communication session, and are also specific to the type of device participating in the communication session (e.g., a phone without video capability is unable to participate in a video sub-session). As described herein, these sub-sessions may be distinguished as either audio sessions or non-audio sessions (or as audio or non-audio portions of a communication session).

Figure 3:
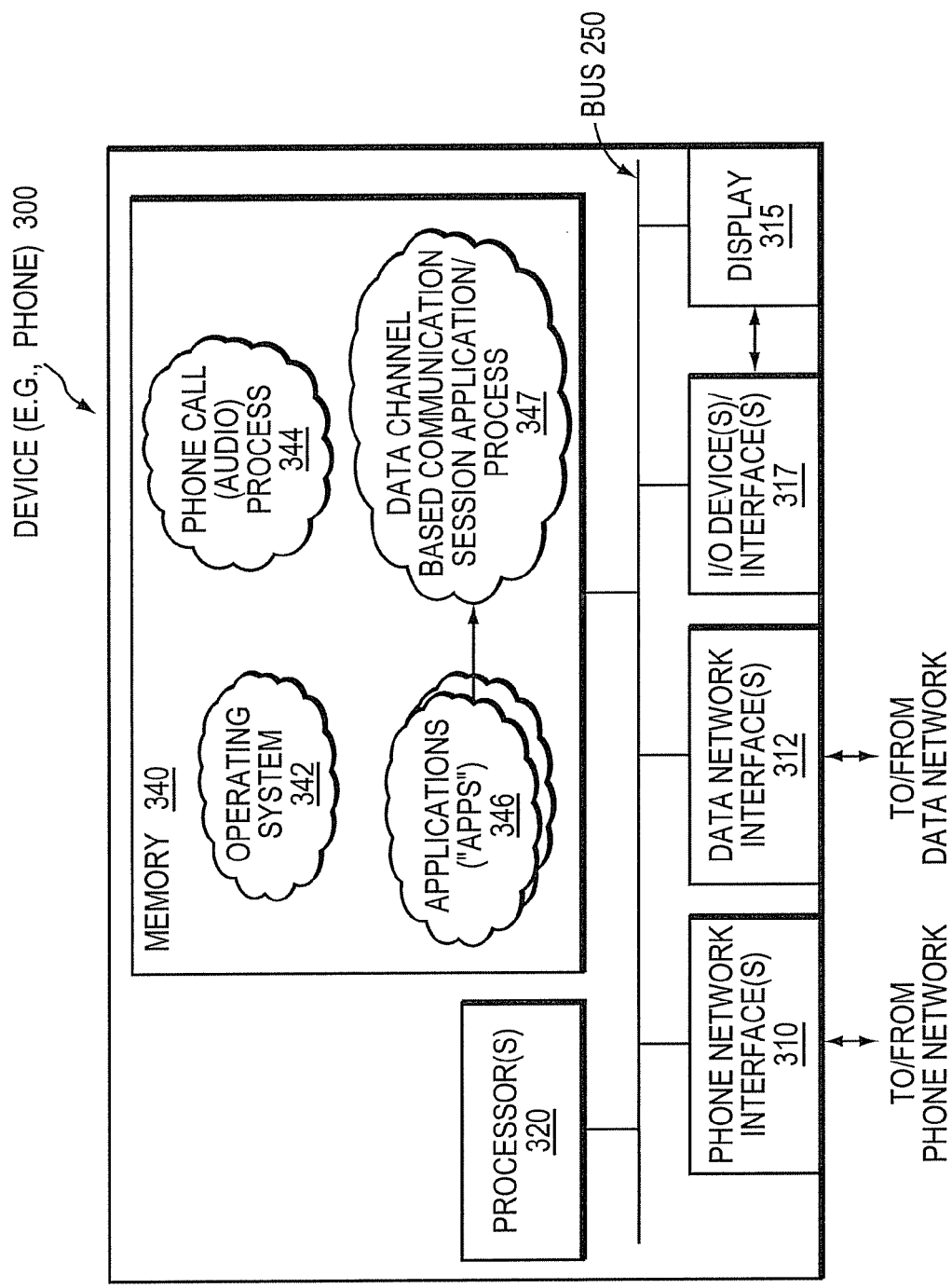
FIG. 3 illustrates an example phone/device.

FIG. 3 illustrates a schematic block diagram of an example device 300 that may be used with one or more embodiments described herein, such as a phone 120/121 or PC 110/111. Illustratively, device 300 may be implemented or incorporated in any suitable computer such as, for example, a PC, laptop, workstation, personal digital assistant (PDA), smart phone, mainframe, file server, workstation, or other suitable data processing facility supported by storage (either internal, e.g., electronic memory, or external, e.g., magnetic/optical disk), and operating under the control of any suitable operating system.

In particular, the device 300 may comprise one or more phone network interfaces 310 and one or more data network interfaces 312, a display 315 and one or more other input/output (I/O) interfaces 317, a processor 320, and a memory 340 interconnected by a system bus 350. Network interfaces 310 and 312 are configured to communicate over the respective networks, as mentioned above. Note that a device with both types of network interfaces is considered a "dual-connected" device, while a device with only a single type of interface is considered a "singly-connected" device. I/O interfaces 317 contain the mechanical, electrical, and signaling circuitry for communicating with one or more user interface devices in addition to the display (monitor/screen) 315, such as a mouse, keyboard, keypad, microphone, etc. Note that the display 315 may also function as an input device, such as touch-screen capabilities (e.g., where the keypad is displayed on the touch-screen).

The memory 340 comprises a plurality of storage locations that are addressable by the processor 320 and the network interfaces 310/312 for storing software programs associated with the embodiments described herein. An operating system 342, portions of which are typically resident in memory 340 and executed by the processor, functionally organizes the device by, inter alia, invoking operations in support of software processes and/or services executing on the device (e.g., for communication sessions). In particular, these software processes and/or services may comprise a phone call process 344 (for phone network attached devices) and one or more applications 346, such as an illustrative data channel based communication session application/process 347 (for data network attached devices) and other applications or "apps" (e.g., email, web browsers, schedule management applications, games, etc.).

The phone call process 344 may be specifically configured to participate in phone calls, such as in accordance with conventional phone operation. That is, the phone call process (or simply, "phone process") 344 is generally configured to receive and transmit audio signals over the phone network 145. Conversely, the data channel based communication session application 347 (or simply, "application 347") may contain computer executable instructions executed by the processor 220 to generally perform functions to manage or control various processes or aspects during the course of a communication session other than phone calls (audio sessions). For instance, application 347 may comprise necessary programming to participate in an online collaborative computing session (e.g., online meetings), video calls, presentations, emails, text messages, etc., and may operate as described herein.

As noted above, certain types of communication, such as online meetings, video, etc., often have both an audio component and a non-audio component (e.g., video, data, etc.). Transmission of the audio and non-audio components for computers interconnected to the Internet may receive both components over a data (e.g. IP) network. Phones, however, generally have a different set of capabilities than online computers, such as limited data bandwidth and/or reduced processing ability. Based on the functionalities and features of certain phones currently available, it may be difficult, inefficient, or impossible to participate in a full communication session that has both and audio and non-audio component.

In accordance with one or more embodiments herein, the audio component of a communication session may first be split from the other non-audio components, and then the audio component may be transmitted over the phone network 145 while transmitting the non-audio components over the data/computer (e.g., IP) network 140. Illustratively, the server-based techniques described herein may be performed by (or in conjunction with) communication session process 244, which contains computer executable instructions to perform the associated techniques.

In particular, as mentioned above, phone provider networks 145 are generally designed to carry audio streams between phones on a higher priority audio/phone channel, while non-audio (e.g., data) streams are passed on a lower priority data channel (data networks 140), as compared to each other. Accordingly, when participating in a video call or online meeting with data (images, information, content, etc.), the audio portion is generally considered to be more important and should remain uninterrupted. Conversely, images, streaming video, data files, documents, roster lists, chat sessions, executable files, etc., may thus be sent over the lower priority (and sometimes less reliable) data channel, as it is not as critical. For instance, a user on a video call may wish to have the audio conversation continue, despite not being able to see the associated video. Alternatively, a phone user may not have video capability on his or her phone, but may still desire to participate in a video call's audio portion.

Figure 4:
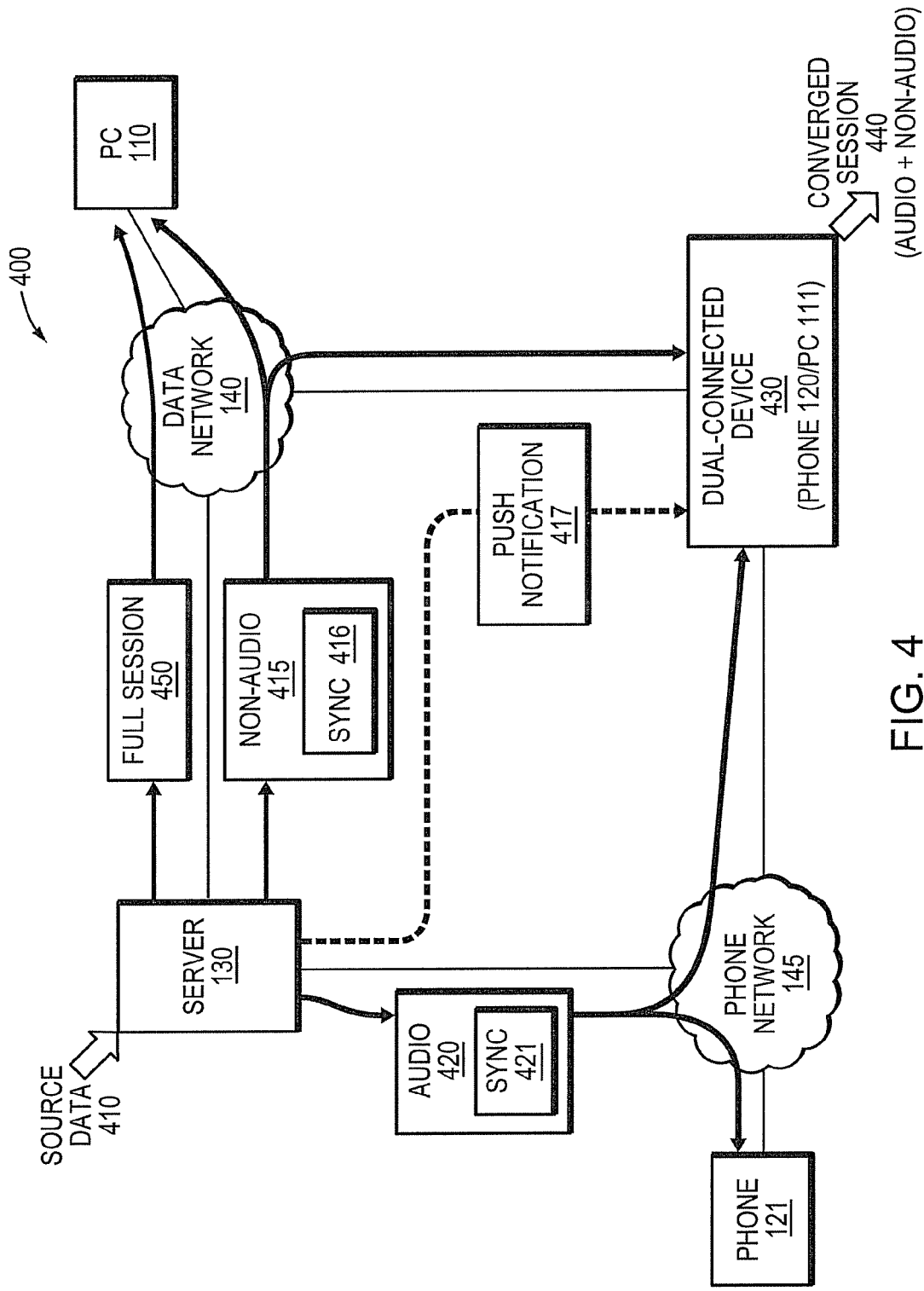
FIG. 4 illustrates an example split communication session over a phone/data network.

FIG. 4 illustrates an example network (e.g., an alternative view of network 100 in FIG. 1), where a server 130 may obtain (e.g., receive) source data 410, such as audio and images/data, from another device in the network or from within its own storage (e.g., memory 240). Note that the source data may originally be arranged as a combined audio and non-audio source, or the server may receive separate audio and non-audio streams. In the event the communication session is combined, the server may split the audio and images/data portions from each other. Then, depending on device configuration (e.g., PCs vs. mobile phones), the audio portion and images/data ("non-audio") portion may be transmitted over the data network simultaneously (unsplit) as a full session 450, or the audio may be transmitted over the phone network 145 as a separate audio portion 420 (audio signals 155) while images and other data may be transmitted separately over the data (e.g., IP) network 140 as non-audio portion 415 (e.g., data packets 150).

PCs 110 that are not connected to the phone network 145 may receive the full session 450 as a single stream from the server 130, and phones 121 that are not connected to the data network 140 may receive only the audio portion 420. Any dual-connected device, such as phones 120 and PCs 111, however, may operate in accordance with one or more embodiments herein to merge the audio portion from the phone channel and the non-audio portion from the data channel into converged session 440, e.g., as described below. Note that phone/audio devices may simply receive the split-off audio portion, and not any images/data, as desired, and as also described below.

This technique may be applied to asynchronous audio/data streams, such as online meetings where the images (e.g., slides) and audio may have slightly offset timing. However, it may also be applied to synchronous audio/data streams, such as splitting video over IP into audio and images, which may be remerged at the receiving device. Synchronization may be accomplished through certain synchronization signaling transmitted via both channels, e.g., timing signals on the audio channel (preferably inaudible signals) and on the data channel. For instance, the server 130 may establish (or determine, if included in a previously split session) synchronization signals for the phone channel and data channel for use with merging the two portions (sub-sessions) by the dual-connected devices 430. Upon receiving the signals, the devices 430 may play and display the corresponding audio and video/images in a manner that synchronizes the two portions according to the synchronization signals. Alternatively, synchronization may be merely roughly estimated, such as transmitting the separate streams at the same time or accounting for delay measurements or estimations to attempt to have the audio and non-audio portions reach the dual-connected devices 430 at approximately the same time.

According to the techniques above, then, the audio component of a data stream (communication session) may be split from any non-audio component(s), and the audio component may be sent over the phone network, while non-audio components may be sent over the data (IP) network, and merged at the mobile device. This technique may be used (e.g., particularly for transmission over 3G mobile networks) for online collaborative computing sessions, video calls, video over IP, etc., where the audio uses the conventional phone network, and the video uses the data network.

Since the audio and non-audio (data) portions of an online meeting may be distributed over separate channels (the phone network and the data/IP network, respectively), one or more embodiments described herein may also be used to provide a way to converge the audio and non-audio parts of a communication session (e.g., meeting, call, etc.) efficiently. That is, the phones (or dual-attached devices, generally) may be configured to play the audio that is received from the phone channel 145 over a speaker (I/O device 317) and display the non-audio data (e.g., images, video, etc.) received from the data channel 140 on display 315. Note that certain non-audio data may be processed prior to display, such as through decompression, decryption, execution, etc. Thus, "display" may generally imply processing and displaying herein.

In certain situations, however, it may be desirable or even necessary to provide a manner in which the audio portion and non-audio portion of a communication session are to be merged from a user's perspective. For instance, an audio session may be established easily with a phone, but a user may desire an efficient way to also participate in the non-audio session associated therewith.

One additional factor, as well, is that certain phone providers (e.g., the iPhone® available from Apple, Inc.®) have a constraint where any third-party applications or "apps" (such as application 347, e.g., a mobile client application available from WebEx®) cannot be run in the background. Due to this constraint, when a phone call comes in (for the audio portion of a communication session), the third-party application is terminated. In these situations, phone providers have responded with a "push notification" feature, where when a phone call interrupts a third-party app, a notification (417 in FIG. 4) may be pushed to the user's phone that allows the user to restart the third-party application (i.e., in the foreground) during the call.

FIG. 5 illustrates an example push notification network 500, where a server 130 may communicate with a push notification system 510. When a push notification is to be sent to the phone 120 (device 430), such as when the server receives a trigger to do so according to techniques herein, the server sends a notice 417a to the push notification system 510, which then forwards the push notification 417b to the phone, e.g., over a proprietary provider network (a data channel).

The push notification feature may be used according to one or more of the embodiments described herein to provide efficient convergence of a split communication session, particularly where a phone terminates an application in response to an incoming phone call. According to one or more embodiments herein, the data channel based communication session application 347 may execute on the phone in order to participate in a full communication session on the phone, and may act in conjunction with the push notification feature. In particular, the application 347 may be used in order to participate in a non-audio portion of the communication session on the data channel with the server in a manner as described herein, while the phone call process participates in the audio portion of the communication session on the phone channel.

According to a first example embodiment, a user may enter a "home screen" on their mobile device and launch the desired application 347 (e.g., a meeting application, video call application, etc.). The application 347 may be used to enter or log in to the meeting/call, such as by having the user enter a meeting ID, phone number, user name/password, etc., to identify the proper session. Alternatively, the application 347 may be pre-configured with the communication sessions, such that the application may present the user with available meetings/calls. FIG. 6A illustrates an example phone display 600 showing an application 347 requesting a user login to a particular communication session.

Once the communication session is established, e.g., when the server 130 authenticates the phone 120 (more particularly, application 347), the meeting server may call the user's phone for the audio portion of the session. For instance, in response to determining that the authenticated participating device is a phone 120, the server 130 may be configured to establish the audio portion of the communication session with the phone, e.g., calling the phone on a corresponding phone channel (phone network 145). As shown in FIG. 6B, the phone's response to the incoming call (the initiated audio portion of the session) is to drop/terminate the application 347.

In order to continue the full communication session after terminating the application 347, a push notification 417 may be provided (e.g., transmitted) during the audio portion of the communication session, requesting that the user (application 347) join the session's non-audio (e.g., data) portion (shown in FIG. 6C). In other words, the push notification may be transmitted on the data channel during the established audio portion on the phone channel, and thus instructs the application 347 to activate its participation in the non-audio portion of the communication session, while at the same the phone is participating in the audio portion of the communication session. Accordingly, in response to receiving the push notification, the application may be re-launched (e.g., in response to a user acceptance or automatically in response to the received push notification), allowing participation in the non-audio portion of the communication session during the ongoing call (e.g., rejoining a terminated non-audio session).

As an example, for an online meeting, the user may thus hear (and contribute to) the audio portion over the high priority phone network 145, while data such as slides, images, etc., may be received over the lower priority data network 140 and processed by the application 347 to provide the user with a fully converged communication session, as shown in FIG. 6D. As another example, the audio portion of a video call may be transmitted over the phone network, while the video portion may be transmitted over the data network. In this example, the audio portion should continue to function on the higher priority phone channel in the event the lower priority video portion is delayed or lost for various reasons. Other examples, such as online television, radio with associated data, etc., may also be used. Notably, as mentioned above, the audio and non-audio portions ("streams") may be asynchronous (e.g., for online meetings) or synchronous (e.g., for video calls), where the non-audio portion of the communication session is synchronized with the audio portion of the communication session. Accordingly, the phones 120 may be configured to synchronize the portions, where appropriate, in order to enhance user experience.

According to a second example embodiment, a user can enter a communication session (e.g., meeting/call) by first being called by the server 130 (or video caller), thus beginning the communication session sequence from FIG. 6B, rather than FIG. 6A. For instance, a configured, preset time may be stored at the server to call one or more phones in order to initiate the communication session (i.e., particularly the audio portion thereof), or the phones may be called in response to the communication session (e.g., a meeting) being started. Also, the server may receive invitations to include a particular phone participant in the communication session, such as invites from meeting hosts or calls from video users. A user may even request through his or her own PC that the server 130 call the user's phone 120 to begin the associated communication session. Once the server has established the audio portion (e.g., the call) with the phone, then a push notification may accompany the answered call to allow the user to also enter the non-audio portion(s) of the communication session.

As a third example embodiment, the user may use the phone 120 to first call into the communication session, such as by dialing a phone number of a server (e.g., a phone number for a particular meeting or particular video call end user's phone). For example, a user may call into a meeting, and be prompted for various authentication information, such as a session ID, passkeys, etc., such that in response to optional authentication of the phone, the audio portion of the communication may be established. Once the call is in progress, the push notification may be sent to the user's phone in order to initiate the associated application 347 for the non-audio portion of the communication session.

Notably, the push notification transmitted by the server may include the necessary login information to join the non-audio portion that relates to the audio portion already in progress. For instance, the session IDs or other identifying information (e.g., user name, passwords, tokens, etc.) may be transmitted in the push notification so the mobile device application 347 may efficiently join the non-audio session. For example, the server may store login information from an initial login by application 347 and map this information to the associated phone. Alternatively, a user's phone may be associated with a user profile stored at the server (e.g., registered), such that the login information for a particular user may be sent to the appropriate phone. Note that while this increases efficiency for converged communication sessions in general, it may also be used where any number of communication sessions could be available to the user to join, such that the application 347 is aware of the proper non-audio session to join that corresponds to the audio portion already in progress at the phone. As such, the application 347 may receive the login information and enter it during its activation authenticate its participation in the non-audio portion of the communication session. Conversely, where the application 347 is used to initiate the communication session (e.g., the first example embodiment above), the application may store, in memory 340, the login information used to log in to the communication session in the first place (e.g., FIG. 6A), and then may enter that login information to authenticate the non-audio portion accordingly.

As an enhancement to embodiments above, the phone user need not join the non-audio portion of the meeting/call in direct response to receiving the push notification. For instance, in response to the push notification, the user may be prompted for acceptance of participation in the non-audio portion of the communication session by the application 347 (e.g., prompted to "activate" the application; alternatively, the application 347 may manage the prompt, such that "activating the application" implies activating its participation in the non-audio portion). In the event the user declines/delays the non-audio portion of the communication session, or where the non-audio portion is otherwise not initiated in response to the audio portion being established, the user may request that a push notification be sent to the phone to enter the non-audio portion at a later time.

For instance, in accordance with one or more embodiments herein, an audio channel code may be used on the phone channel during an audio sub-session to request that a push notification be sent on-demand to the user's phone, such as certain dual-tone multi-frequency (DTMF) codes on the phone's audio channel (e.g., pressing "*2" or other code on the phone's keypad) that may be recognized by the server 130. This audio code sent over the phone channel from the phone is received/detected by the server during the audio portion of the communication session, similar to interactive voice response (IVR). Specific to the embodiments herein, however, this audio code on the phone channel then triggers the appropriate push notification over the data channel as described above, such as sending a request to a push notification server (or network) 510. The push notification may be sent to the user's phone, and then the user may open the associated data content application 347 on the phone as requested. For example, a user may first join an audio portion of a communication session, such as an online meeting, but may decide to simply "listen in." If the user later desires to participate in the non-audio portion, such as where a presenter is referencing a particular slide or image, the user may then use the phone to enter the pre-defined audio code, which when recognized by the server, initiates the push notification to join the non-audio portion as described above. Similar interaction may be used for video calls, first participating in an audio sub-session, and then requesting video imagery on-demand at a later time.

Note that the audio portion or the non-audio portion may be separately stopped at the phone by ending the call or terminating the application 347. The terminated application may be re-initiated by requesting another push notification using the audio codes mentioned above, while an ended call may be re-initiated by requesting through the application 347 that the server call the user's phone back (initiating the sequence of terminating the application and sending a push notification to restart it, as mentioned above). Alternatively, once either the call or application 347 is stopped, the entire communication session may be configured to cease. Thus, in this situation, termination of either the call or application 347 causes resultant termination of the application or call, respectively.

The techniques described herein may thus be used to allow for efficient transmission of split audio and non-audio components of a communication session over a phone channel and data channel, respectively. The techniques above may also be used to allow for efficient and user-friendly merging of the separate portions at dual-attached devices (e.g., mobile phones). In particular, once a phone call is started for the audio portion of a communication session, e.g., terminating an associated application 347, then a push notification may be transmitted to allow for the efficient activation of the application 347 to join the corresponding non-audio portion (e.g., without having to enter or re-enter the necessary login information). Also, the techniques above allow for on-demand requesting of the push notification during the audio call in order to enter the non-audio portion as desired. In other words, one or more embodiments allow a mobile user to receive simply the audio portions thereof, and then optionally request the associated non-audio at a later time, such as using the convenient DTMF key codes.

As mentioned, the one or more embodiments above may apply to online meetings or video calls (e.g., video over IP), where the application 347 may be used to display the associated content (e.g., images) received over the data network 140, while audio is received over the phone network 145. Accordingly, sources of data ("source data") may comprise, among other things, online collaborative computing sessions, online meetings, videos, video calls, video over IP, etc.

Figure 7:
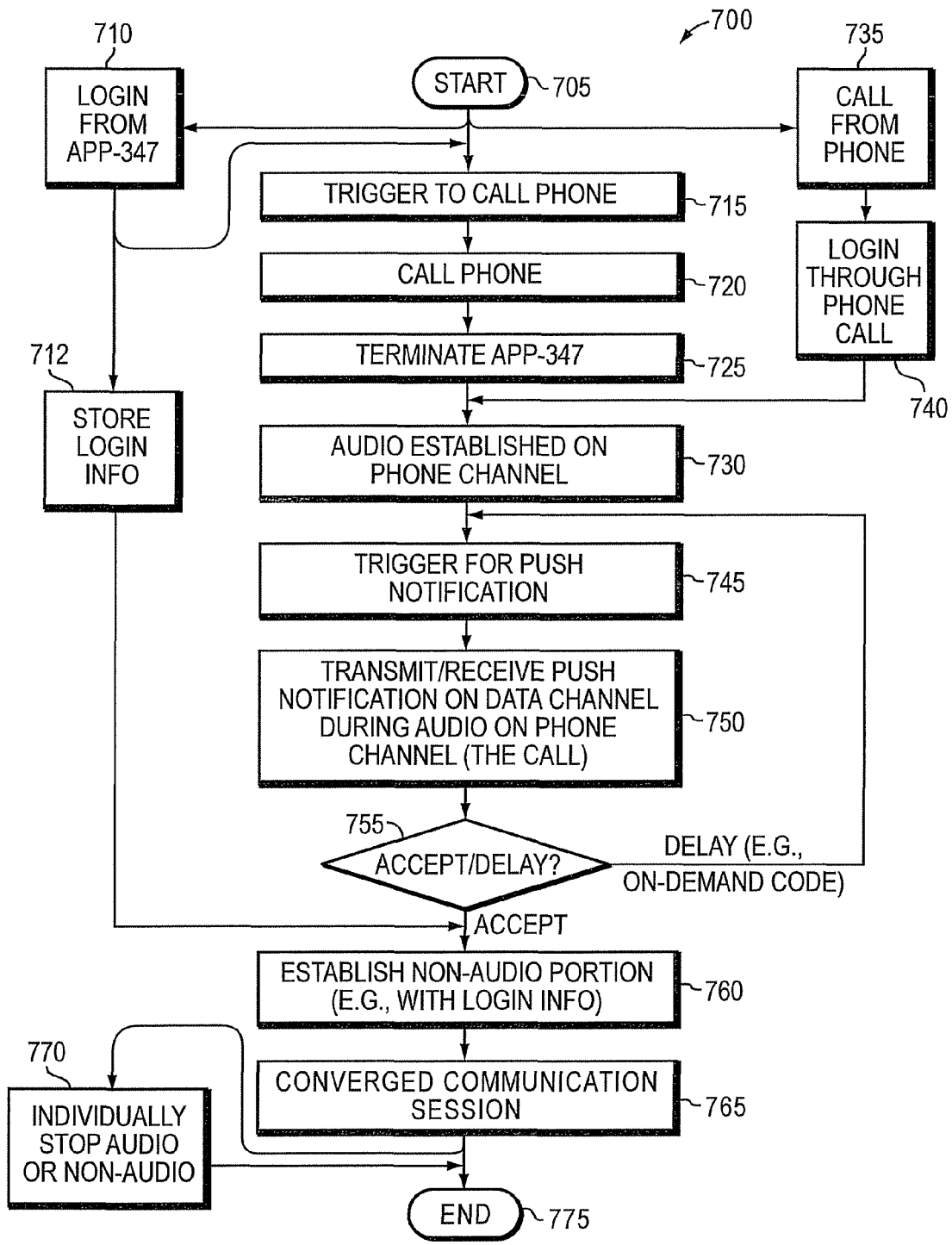
FIG. 7 illustrates an example procedure for converging audio and non-audio portions of a communication session using a push notification.

FIG. 7 illustrates an example procedure for converging audio and non-audio portions of a communication session using a push notification in accordance with one or more embodiments described herein. The procedure 700 starts at step 705, and continues to the possible entry points to begin the communication session. For instance, in step 710, a user may use the application 347 on their device 430 (e.g., phone 120 or other device) to log in to the communication session as described above (where also as described above, in step 712 the associated login information may optionally be stored for later use). Once the login is successful in step 710, or in response to other impetus as an entry point (e.g., received invitations, calendar times, etc., mentioned above), then in step 715 the server 130 receives a trigger to call the phone, and in step 720 does so on the audio channel. Upon receiving the call, the phone may terminate the application 347 in step 725, such as where required by the phone's operating system 342, and the audio portion of the communication session is accordingly established between the server and the phone in step 730. Note that another entry point described above is shown in step 735, where the phone initiates the call to/via the server, and any necessary login information is entered via the phone channel in step 740 to establish the audio portion of the session (step 730).

In order to initiate the non-audio portion of the communication session in accordance with one or more particular embodiments herein, the server in step 745 first receives a trigger to transmit the push notification 417 to the phone. For instance, as mentioned above, the trigger may be automatic in response to the audio portion being established, or may be on-demand based on a user's input over the phone channel, such as certain DTMF codes (e.g., "*2") at a later time. Once the trigger is received, then the push notification is transmitted on the data channel in step 750, optionally, in one or more embodiments, with the login information needed to enter the non-audio portion associated with the established audio portion. The push notification may then be received by the phone (step 750) during the call already in progress, i.e., during the audio portion of the communication session.

Optionally, in step 755, the user may accept or decline/delay the push notification, and then in step 760 (e.g., accepted or by default) the non-audio portion of the session may be initiated by activating the associated application 247 and logging in to the session. For instance, for secured communication sessions, the login information may be stored on the phone (step 712), received in the push notification (step 750), or entered manually on the phone. As a further option for security in step 755, nominal additional information may be requested, such as entering a pin, password, or other security measure, while the login information comprises session IDs or other necessary information.

The result of the audio portion already in progress and the subsequently established non-audio portion is the converged communication session in step 765. Notably, in step 770, it may be possible to stop either the audio portion or the non-audio portion at the phone (e.g., ending the call or terminating the application 347). The procedure 700 ends in step 775, such as when the communication session has ended.

Advantageously, the novel techniques described herein efficiently converge audio and non-audio portions of a communication session with phones on a phone channel and a data channel. In particular, the techniques described above allow audio components of a session to utilize phone networks that are designed for audio transmission and have high priority over data, while reducing bandwidth from within data/IP network by only (and optionally) sending non-audio components over the data/IP network. In addition, the techniques described above efficiently converge the audio and data portions of a session (e.g., meeting or video), for instance, without having to manually enter configuration information (e.g., login data). Further, the techniques allow a user to conveniently and easily dictate when it is desired to begin receiving and displaying the non-audio portion (e.g., data and images) of the session, such as through the use of DTMF key codes.

While there have been shown and described illustrative embodiments that efficiently converge audio and non-audio portions of a communication session, it is to be understood that various other adaptations and modifications may be made within the spirit and scope of the embodiments herein. For example, the embodiments have been shown and described herein using mobile phones interconnected to a phone network (channel) and a data network (channel). However, the embodiments in their broader sense are not so limited, and may, in fact, be used with any device interconnected to a phone network and data network, such as desktop phones, computers (e.g., with a modem and internet interface), etc.

In addition, while the DTMF key codes have been described above to trigger a push notification specific to application 347, other results may occur that may be used to tie an audio sub-session in progress to a desired non-audio sub-session. For instance, an email, text (e.g., SMS message), or other message may be sent to the phone that includes a selectable (e.g., "clickable") link to access the associated non-audio portion of the communication session, such as URLs (uniform resource locators), web addresses, IP addresses, etc. As such, the push notification is only one example message type to easily correlate in progress audio sub-sessions with subsequent non-audio sub-sessions through the activation of application 347. Note further, that the associated non-audio portion that is triggered may be an email or other message including the non-audio portion of the communication session that is displayed through a different system, such as sending an email of the current slide shown in a presentation, which may be viewed by the phone or later on a PC (in standard email fashion). In this instance, the email address of the phone user may be pre-registered with the servers 130.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible computer-readable medium (e.g., disks/CDs/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
    obtaining, on a phone, a push notification associated with an application during active participation by the phone in an audio portion of a communication session on a phone channel, the application configured to participate in a non-audio portion of the communication session on a data channel, the push notification provided on the data channel by a server participating in the audio portion and the non-audio portion of the communication session independently of the participation therein by the phone; and
    activating the application on the phone in response to the push notification to participate in the non-audio portion of the communication session during active participation by the phone in the audio portion of the communication session.

2. The method as in claim 1, further comprising:
prompting for acceptance of participation in the non-audio portion of the communication session in response to the push notification and prior to activating the application.

3. The method as in claim 1, further comprising:
logging in to the communication session by the application prior to the phone participating in the audio portion of the communication session; and
terminating the application in response to initiation of the audio portion, which is initiated in response to the login, wherein the push notification is provided after the termination of the application and during the audio portion of the communication session.

4. The method as in claim 3, further comprising:
storing, by the application, login information used to log in to the communication session; and
entering the login information during activation of the application to authenticate the participation in the non-audio portion of the communication session.

5. The method as in claim 1, further comprising:
obtaining login information by the application from the push notification; and
entering the login information during activation of the application to authenticate the participation in the non-audio portion of the communication session.

6. The method as in claim 1, wherein the push notification is provided in response to an audio code sent over the phone channel from the phone to the server during the audio portion of the communication session.

7. The method as in claim 1, wherein the communication session is selected from a group consisting of: an online collaborative computing session; an online meeting; a video; a video call; and a video over internet protocol call.

8. The method as in claim 1, further comprising:
synchronizing the non-audio portion of the communication session with the audio portion of the communication session.

9. A method, comprising:
establishing, by a server, an audio portion of a communication session with a phone on a phone channel, the server participating in the audio portion of the communication session independently of the participation thereof with the phone;
obtaining a trigger by the server to provide a push notification on a data channel to the phone, the push notification associated with an application executing on the phone configured to participate in the non-audio portion of the communication session on the data channel with the server, the push notification to instruct the application to activate participation in the non-audio portion of the communication session during participation by the phone in the audio portion of the communication session; and
providing the push notification from the server to the phone on the data channel during the established audio portion on the phone channel.

10. The method as in claim 9, further comprising:
establishing the non-audio portion of the communication session with the application in response to the application obtaining the push notification.

11. The method as in claim 9, wherein establishing the audio portion comprises:
calling the phone from the server on the phone channel.

12. The method as in claim 11, further comprising:
obtaining a login from the application for the communication session; and
authenticating the login of the application for the communication session, wherein calling the phone is in response to the authenticating.

13. The method as in claim 11, further comprising:
obtaining an invitation to include a particular phone participant in the communication session, wherein calling the phone comprises calling the particular phone participant in response to the obtained invitation.

14. The method as in claim 11, further comprising:
storing a preset time to call a particular phone participate participant for the communication session, wherein calling the phone comprises calling the particular phone participant at the preset time.

15. The method as in claim 9, wherein obtaining the trigger comprises:
determining that the audio portion of the communication session is established.

16. The method as in claim 15, wherein the audio portion of the communication session is established in response to authentication of the phone.

17. The method as in claim 9, wherein obtaining the trigger comprises:
detecting an audio code obtained over the phone channel from the phone during the audio portion of the communication session.

18. The method as in claim 9, wherein providing the push notification comprises:
including login information correlated with the communication session for use by the application to log in to the non-audio portion of the communication session.

19. An apparatus, comprising:
one or more phone network interfaces configured to communicate audio transmissions on a phone channel over a phone network;
one or more data network interfaces configured to communicate data transmissions on a data channel over a data network;
a processor configured to execute one or more processes; and
a memory configured to store a process, the process when executed operable to:
establish an audio portion and a non-audio portion of a communication session that is independent of the participation thereof with a phone;
obtain a trigger to provide a push notification on the data channel to the phone, the push notification associated with an application executing on the phone configured to participate in the non-audio portion of the communication session on the data channel, the push notification to instruct the application to activate participation in the non-audio portion of the communication session during participation by the phone in the audio portion of the communication session on the phone channel; and
provide the push notification to the phone on the data channel during the established audio portion on the phone channel.

20. The apparatus as in claim 19, wherein the process when executed is further operable to:
establish the non-audio portion of the communication session with the application in response to the application obtaining the push notification.

* * * * *